Nov. 8, 1955  C. R. PETERSON ET AL  2,723,095
PARACHUTE PACK OPENER
Filed March 24, 1954  2 Sheets-Sheet 1
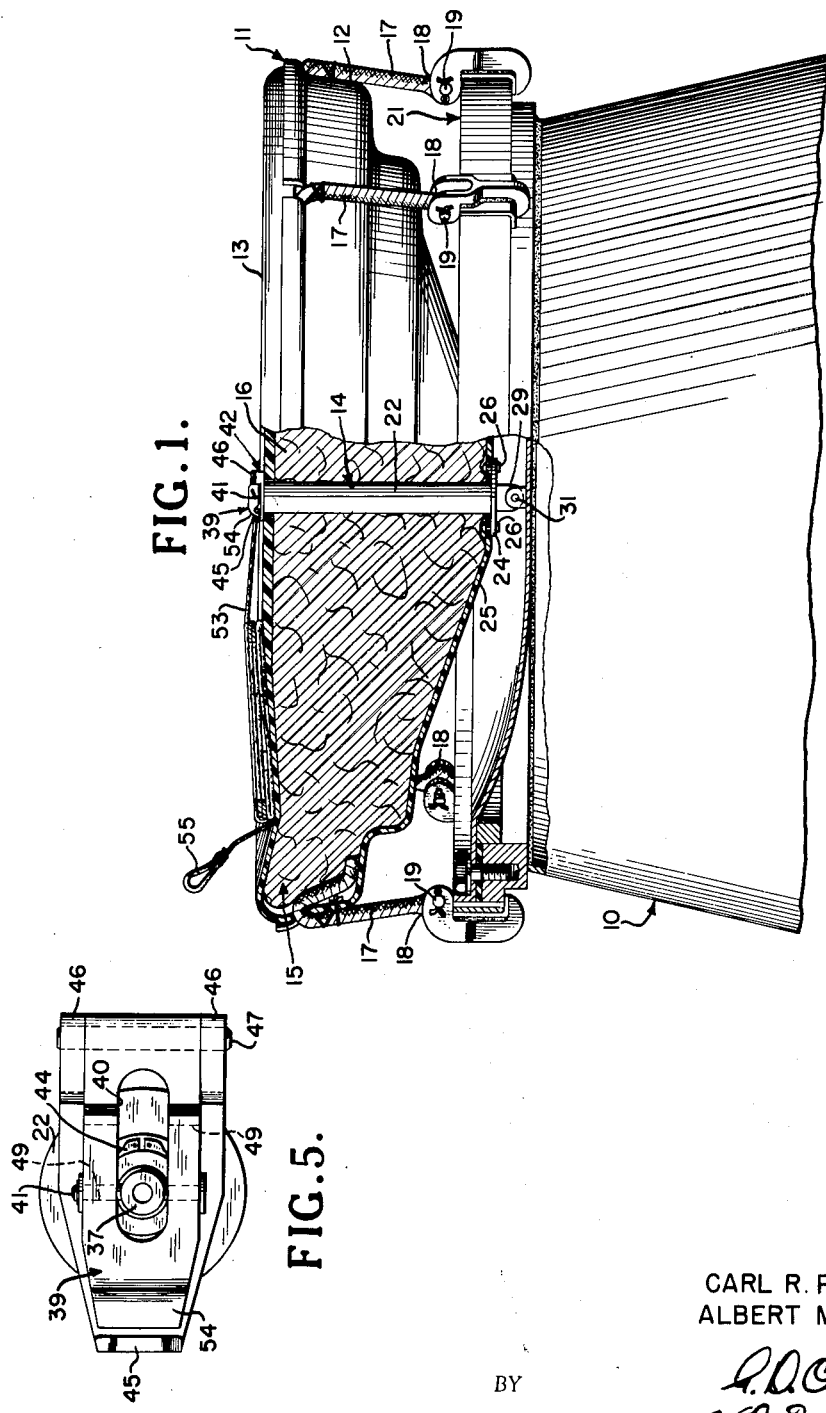
INVENTORS
CARL R. PETERSON
ALBERT M. MITNICK
BY
ATTORNEYS

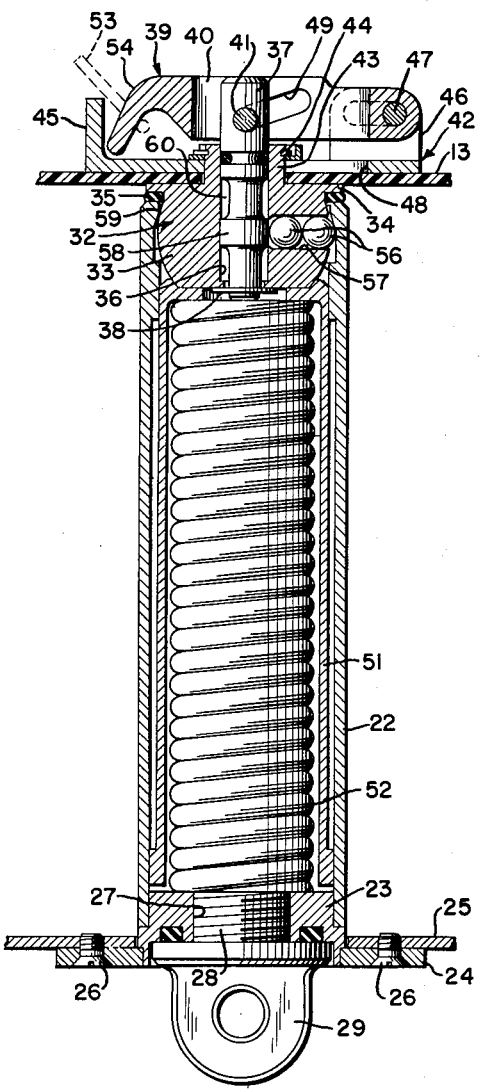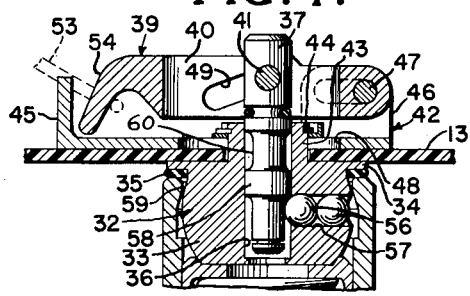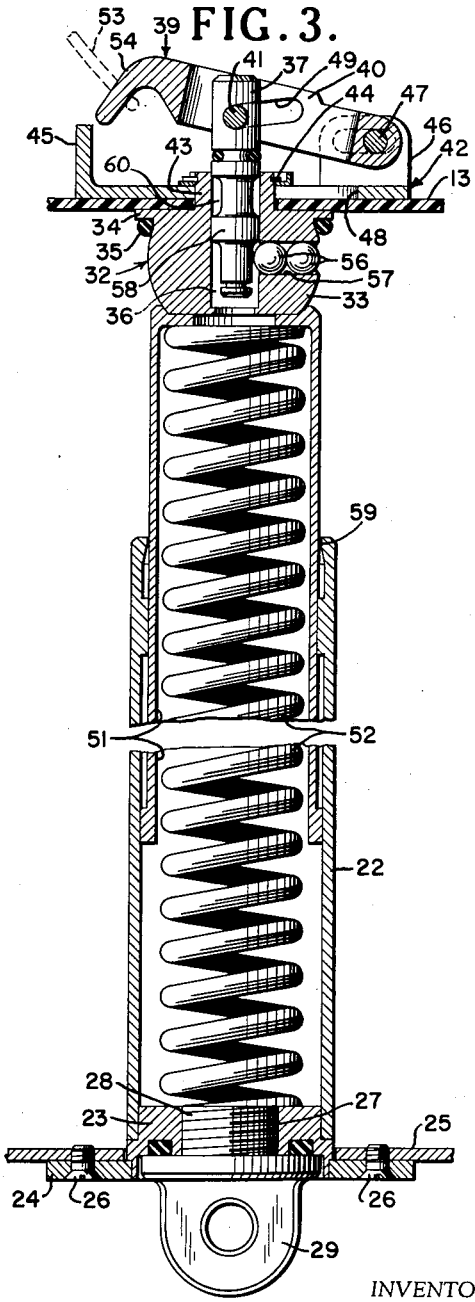

United States Patent Office 2,723,095
Patented Nov. 8, 1955

2,723,095

PARACHUTE PACK OPENER

Carl R. Peterson and Albert M. Mitnick, Silver Spring, Md., assignors to the United States of America as represented by the Secretary of the Navy Application March 24, 1954, Serial No. 418,488

5 Claims. (Cl. 244—148)

(Granted under Title 35, U. S. Code (1952), sec. 266)

The invention described herein may be manufactured and used by or for the Government of the United States of America for governmental purposes without the payment of any royalties thereon or therefor.

The present invention relates to a release device and more particularly to a new and improved parachute pack release device adapted for use with aerial launched mines and other ordnance equipment.

In parachute pack release devices heretofore used with aerially launched mines and the like many disadvantages have been encountered such, for example, as premature release of the parachute from the pack, and damage to the parachute as the parachute is withdrawn from the pack by the static line.

The present invention provides a new and improved release device wherein the aforementioned difficulties have been overcome by providing a new and improved means for preventing premature release of the parachute from the pack and which prevents damage or tearing of the parachute as the parachute is withdrawn from the pack. Moreover, the present invention relates to improvements in release devices such, for example, as the type disclosed in Letters Patent of the United States, Number 2,476,969 granted July 26, 1949 to G. L. Fogal et al. and more particularly the invention relates to an improvement in the centrally disposed locking pin arrangement thereof.

An object of the present invention is the provision of a new and improved release device for a parachute pack.

Another object of the invention is to provide a new and improved release device for the cover of a parachute pack which is readily releasable and which positively locks the cover to the pack until the release device is actuated to a release position whereupon the cover is forcibly ejected from the pack.

Still another object of the invention is to provide a new and improved parachute pack release device which will invariably release and eject the cover from the pack after the mine is released from an aircraft in flight thereby to permit the parachute to be withdrawn from the pack.

Other objects and many of the attendant advantages of this invention will be readily appreciated as the same becomes better understood by reference to the following detailed description when considered in connection with the accompanying drawings wherein:

Fig. 1 is a fragmentary elevational view of the tail portion of a mine with a conventional parachute pack attached thereto and illustrating the manner in which the release device of the present invention is connected thereto;

Fig. 2 is an enlarged sectional view of the release device in an initial locked condition;

Fig. 3 is a view similar to Fig. 2 with the device in a released condition;

Fig. 4 is a fragmentary sectional view with the device in a release condition in response to a lateral pull exerted thereon; and Fig. 5 is an end view of the device of Fig. 2.

Referring now to the drawing wherein like numerals designate like parts throughout the several views and more particularly to Fig. 1, a mine of the type adapted to be launched from an aircraft in flight is indicated by the reference character 10, and 11 indicates a conventional parachute pack. The pack 11 includes a dish-shaped casing 12 and a cover 13 releasably secured thereto by the release device of the present invention generally indicated by the reference character 14. Enclosed within the casing 12 and maintained therein by the cover 13 is a parachute 15 comprising a canopy 16. The canopy is provided with a plurality of shroud lines 17 having looped ends 18 secured as at 19 to a parachute release mechanism 21 which is adapted to automatically release the parachute from the mine as the mine strikes the surface of a body of water, the shroud line being secured to the rim or hem of the parachute in the usual manner.

The release device 14 of the present invention comprises a tubular member 22 having a plug 23 disposed in one end of the tube 22 and secured therein in any suitable manner. The plug 23 is provided with a flange 24 in engagement with and secured to the wall 25 of the dish-shaped casing as at 26. The plug 23 is provided with a centrally disposed opening 27 having threaded therein a stud or boss 28 upon which is formed an ear 29, the ear being secured to the mine casing as at 31. By the aforesaid arrangement the tubular member 22 is disposed and secured centrally within the casing 12. If desired, however, this arrangement may be utilized to effect operation of any device located in the mine casing as the mine enters the water at which time separation of the parachute housing 12 is effected by the parachute release mechanism 21.

As more clearly shown on Fig. 2 a cap 32 is disposed within one end of tube 22 and comprises a body portion 33 having a flange 34 formed thereon in engagement with the cover and a sealing gasket 35 disposed between the flange and the end of the tube. The body portion 33 of the cap 32 has formed therein and extending therethrough a bore 36 having a plunger 37 releasably and slidably arranged therein, one end of the plunger being provided with retaining ring 38 in engagement with the body portion 33 of the cap 32, the other end thereof being disposed in an elongated opening 40 formed in a latch 39 and secured thereto by a pin 41.

A bracket or support generally indicated by the reference character 42 is rotatably supported on the boss 43 formed on the cap 32 and maintained thereon by a washer and split ring arrangement 44. The bracket comprises a lip 45 formed on one end thereof and a pair of mutually spaced ears 46 formed on the other end thereof between which is pivoted the latch or lever 39 as by a pin 47. The bracket 42 is provided with an elongated slot 48 through which the aforesaid boss 43 extends, the lever 39 being provided with a pair of inclined cam slots 49 bordering on the slot 40, the pin 41 extending through the slot 49, as more clearly shown on Figs. 2 and 3.

Disposed within the tubular member is an elongated cylindrical member 51 having one end thereof in engagement with the cap 32 and the other end thereof disposed in substantial abutting engagement with the plug 23. A spring 52 is disposed within the member 51, one end of the spring being in engagement with the plug 23, the other end thereof being in engagement with one end of the member 51. By the aforesaid arrangement, it will be understood that the spring is normally compressed and thus exerts an outward thrust on the member 51.

As more clearly shown on Fig. 1, the static line 53 is normally in engagement with the bill or nib 54 formed on the latch member 39, the bill being in alignment with lip 45 thereby to protect the bill from accidental blows and also prevent displacement of the static line therefrom. Moreover, the static line is provided with the conventional trigger hook 55 whereby the static line may be attached to the aircraft. Furthermore, it will be understood that the conventional line is connected to the cover and the hem or vent of the parachute and thus the parachute may be readily withdrawn from the casing 12 as the cover 13 is ejected from the casing by the release device.

Referring now to Fig. 2, it will be noted that the member 51 is normally locked to the tube 22 by a pair of locking balls 56 disposed within a bore 57 formed in cap body 33, one of the balls being in engagement with an annular enlargement 58 formed on plunger 37. the other ball being in locking engagement with a shoulder 59 formed on one end of the tube 22.

In the aforesaid arrangement it will be noted that the plunger 37 is maintained in the position shown on Fig. 2 by the aforesaid retaining ring 38 and the bracket 42 is locked to the cover by the split ring 44 detachably secured to the boss 43 on cap 33. However, the ring 38 is stripped from the plunger upon actuation of the lever 39 by the static line 53 when the missile has been released from an aircraft in flight and traveled a predetermined distance therefrom. When this occurs the ejector is adapted to forcibly eject the cover 13 from casing 12. Furthermore, since the lever is free to rotate about the boss 43 and free to translate in the direction of the static line pull, the device will be actuated to a release position by the static line in response to pull therefrom in any direction. Moreover, it will be understood that movement of the hinge lever perpendicular to the axis of the plunger 37 causes pin 41 to ride in an upward direction in the cam slots 49 in lever 39, thus moving the lever an amount sufficient to cause the ring 38 to be stripped from the plunger. In response to such movement the plunger releases the locking ball 56 from locking engagement with the shoulder 59 on the tube 22. When this occurs, the cylindrical member 51 and cap 32 are moved with sufficient force by spring 52 to eject the cover 13 from the casing 12 whereupon the parachute is withdrawn from the casing 12 by the conventional line attached to the cover and hem or vent of the parachute. The spherical shape of the cap prevents binding of the cap within the tube 22 as the cap and cylindrical member 51 is ejected from the tube 22. Furthermore, it will be understood that when the device has been actuated to a release position in the aforesaid manner the cover and the locking means will fall away or be blown from the static line and thus the free end of the static line is relieved of dangling metallic elements which could cause serious damage to the fuselage of the aircraft after the mine has been released therefrom.

In order to provide for initial latching of the assembly to a condition shown in Fig. 2 the plunger 37 is provided with a recessed portion at 60. The latching is accomplished before the pin 41 is inserted through the plunger 37 and the latch 39. This permits the plunger to which the ring 38 has been attached to be moved to a position wherein the balls 56 are permitted to move laterally into the recessed portion 60 thereby permitting the body portion 33 to pass the portion 59 of the tube 22. After the body portion is inserted, the plunger 37 is withdrawn to force the ball elements 56 outwardly and maintain a latched arrangement by contact of the balls by the portion 58 of the plunger 37. This locks the plug in the tube 22. The pin 41 is thereafter inserted through the slots 49 of the latch 39, and it extends through the plunger 37 as shown at 41.

From the foregoing, it will be apparent that a new and improved parachute pack release device has been devised wherein means are provided for preventing premature release of the parachute from the parachute pack during the flight of the aircraft, and which positively locks the parachute within the pack and which is readily released by the static line whereupon the parachute is withdrawn from the pack by the static line without damage thereto.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A cover release device for a parachute pack comprising a casing secured to said pack, an ejector releasably locked to said casing, means including a pair of locking balls for releasably locking said ejector to said casing, means including a lever for actuating said locking means to a release position in response to a sudden pull applied thereto, and resilient means for actuating said ejector to forcibly move the cover from said pack as said locking means is actuated to said release position whereby the parachute may be withdrawn from said pack.

2. A cover release device for a parachute pack comprising a casing secured to said pack, an ejector disposed within and releasably locked to said casing, means including a plunger detachably secured to said ejector for releasably locking said ejector to said casing and adapted to be detached therefrom as the plunger is actuated to a release position, a pivotally mounted actuating member secured to said plunger for actuating the plunger to a released detached position in response to a sudden pull applied thereto, means including a pair of cam slots arranged within said actuating member for causing the plunger to be moved to said released detached position, and resilient means disposed within said ejector for moving said ejector with sufficient force to detach said cover from said pack whereby the parachute may be withdrawn from said pack.

3. A cover release device for a parachute pack comprising a tubular member disposed within and fixed to said pack, an ejector disposed within and releasably locked to said tubular member, means including a plunger detachably secured to said ejector for releasably locking said ejector to said tubular member, a bracket carried by said device and disposed on said cover, an actuating member pivotally mounted on said bracket and secured to the plunger and actuated in response to a sudden pull applied thereto, a pair of cam slots arranged within said actuating member, a pin for securing said actuating member to said plunger and disposed within said cam slots for causing the plunger to be moved to said release position by an amount sufficient to be detached from said ejector as said actuating member is actuated by said sudden pull, and a spring disposed within said ejector for forcibly ejecting the ejector from said tubular member with sufficient force to detach said cover from said pack whereby the parachute may be withdrawn from said pack.

4. A cover release device for a parachute pack comprising in combination, a dish-shaped housing forming a part of said pack, a cover for said pack, means for releasably locking the cover to said housing and including a plunger and a pair of locking balls, a static line secured to one end of said aircraft, an actuating member secured to the other end of the static line for actuating said locking means to release said cover, and means for ejecting said cover from said housing as said locking means is actuated to a release position whereby the parachute may be released from said pack.

5. A device for releasing a parachute from a closure attached to a mine adapted to be launched from an aircraft in flight and comprising in combination, a static line having one end thereof attached to the aircraft, a housing forming a part of said closure and having a cover releasably locked thereto for maintaining a parachute within said pack, a tubular casing disposed within and fixed to said housing, an ejector disposed within and releasably locked to said casing for ejecting said cover from the housing as the ejector is released from said casing, locking means for said ejector, means including a lever connected to the other end of the static line for releasing said locking means from the casing as the lever is actuated in response to a sudden pull thereon by said static line as the mine is released and falls away from said aircraft, and spring means disposed within the ejector for forcibly ejecting the ejector from said tubular casing with sufficient force to detach said cover from the housing as the ejector is released whereby said parachute is released from said housing.

References Cited in the file of this patent

UNITED STATES PATENTS

| | | |
|---|---|---|
| 1,037,749 | Feall | Sept. 3, 1912 |
| 1,597,918 | Mangan | Aug. 31, 1926 |
| 1,720,041 | Hall | July 9, 1929 |
| 2,365,445 | Badowski | Dec. 19, 1944 |

FOREIGN PATENTS

| | | |
|---|---|---|
| 734,695 | France | Aug. 8, 1932 |
| 979,155 | France | Dec. 6, 1950 |